US011409700B2

(12) United States Patent
Ren et al.

(10) Patent No.: US 11,409,700 B2
(45) Date of Patent: Aug. 9, 2022

(54) METHOD, ELECTRONIC DEVICE AND COMPUTER PROGRAM PRODUCT FOR SNAPSHOT REPLICATION

(71) Applicant: EMC IP Holding Company LLC, Hopkinton, MA (US)

(72) Inventors: Changsheng Ren, Shanghai (CN); Qiu Shang, Shanghai (CN); Yue Qian, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 222 days.

(21) Appl. No.: 16/654,283

(22) Filed: Oct. 16, 2019

(65) Prior Publication Data
US 2020/0133919 A1 Apr. 30, 2020

(30) Foreign Application Priority Data
Oct. 31, 2018 (CN) .......................... 201811288911.3

(51) Int. Cl.
G06F 16/11 (2019.01)
G06F 11/30 (2006.01)
G06F 3/06 (2006.01)

(52) U.S. Cl.
CPC ............ G06F 16/128 (2019.01); G06F 3/065 (2013.01); G06F 3/067 (2013.01); G06F 3/0608 (2013.01); G06F 3/0641 (2013.01); G06F 11/3034 (2013.01); G06F 16/11 (2019.01)

(58) Field of Classification Search
CPC .... G06F 16/128; G06F 3/0608; G06F 3/0641; G06F 3/065; G06F 3/067; G06F 11/3034; G06F 16/11
See application file for complete search history.

(56) References Cited

U.S. PATENT DOCUMENTS

| | | | |
|---|---|---|---|
| 8,655,848 B1 * | 2/2014 | Leverett | G06F 16/1844 707/660 |
| 9,396,205 B1 * | 7/2016 | Lewis | G06F 16/182 |
| 10,235,088 B1 | 3/2019 | Baruch et al. | |
| 10,296,517 B1 * | 5/2019 | Kumar | G06F 3/067 |
| 10,534,547 B2 | 1/2020 | Meiri et al. | |
| 10,802,935 B2 | 10/2020 | Chen et al. | |
| 10,929,047 B2 | 2/2021 | Meiri et al. | |
| 10,942,813 B2 * | 3/2021 | Pandit | G06F 11/1451 |
| 10,976,937 B1 | 4/2021 | Quinn et al. | |

(Continued)

Primary Examiner — Alford W Kindred
Assistant Examiner — Tiffany Thuy Bui
(74) Attorney, Agent, or Firm — BainwoodHuang

(57) ABSTRACT

Techniques involve: in response to a first session for asynchronous snapshot replication being established between a first source device and a destination device, determining whether the first source device and the destination device have a common baseline snapshot. Such techniques further involve: in response to determining absence of the baseline snapshot, determining whether initial synchronization from a second source device to the destination device is completed. Such techniques further involve: replicating, based on a result of the determining, at least one user snapshot at the first source device to the destination device. Accordingly, duplicated user snapshots at the destination device are significantly reduced. The snapshot management and space utilization of the destination device are also improved.

11 Claims, 5 Drawing Sheets

(56) References Cited

U.S. PATENT DOCUMENTS

| | | | |
|---|---|---|---|
| 11,055,014 B2 | 7/2021 | Chen et al. | |
| 11,068,191 B2 | 7/2021 | Chen et al. | |
| 11,144,232 B2 | 10/2021 | Chen et al. | |
| 2012/0136832 A1* | 5/2012 | Sadhwani | G06F 11/1469 707/640 |
| 2013/0073519 A1* | 3/2013 | Lewis | G06F 3/0641 707/610 |
| 2014/0136483 A1* | 5/2014 | Chaudhary | G06F 16/316 707/639 |
| 2014/0359058 A1* | 12/2014 | Karnawat | G06F 3/0611 709/217 |
| 2016/0292250 A1* | 10/2016 | Chen | G06F 16/273 |
| 2016/0314046 A1* | 10/2016 | Kumarasamy | G06F 11/1451 |
| 2017/0315874 A1* | 11/2017 | Patnaik | G06F 11/2094 |
| 2018/0356989 A1* | 12/2018 | Meister | G06F 3/0649 |
| 2019/0332488 A1* | 10/2019 | Bono | G06F 11/1451 |

\* cited by examiner

METHOD, ELECTRONIC DEVICE AND COMPUTER PROGRAM PRODUCT FOR SNAPSHOT REPLICATION

CROSS-REFERENCE TO RELATED APPLICATION

This application claims priority to Chinese Patent Application No. CN201811288911.3, on file at the China National Intellectual Property Administration (CNIPA), having a filing date of Oct. 31, 2018, and having "METHOD, ELECTRONIC DEVICE AND COMPUTER PROGRAM PRODUCT FOR SNAPSHOT REPLICATION" as a title, the contents and teachings of which are herein incorporated by reference in their entirety.

FIELD

Embodiments of the present disclosure relate to the field of data storage, and more specifically, to a method, electronic device and computer program product for snapshot replication.

BACKGROUND

For the purpose of better data protection, a storage system usually supports to replicate via asynchronous replication snapshots of a file system to either a local or a remote site with a different retention policy. Such a local or remote site may be regarded as a backup site. Both scheduled snapshots and snapshots created by user may be replicated to a backup site from a host site. When the host site is switched from a previous site to another site that is in a synchronous replication session with the previous site, there is a need to preserve asynchronous replication between the new host site and the backup site. That is, the asynchronous replication session of a snapshot will be switched from the previous site to the new host site. However, when the new host site performs initial synchronization of snapshots with the backup site, a snapshot already existing at the backup site might be also replicated, which leads to duplicated snapshots at the backup site. Therefore, there is a need for a snapshot replication solution to avoid duplicated snapshots.

SUMMARY

Embodiments of the present disclosure provide a solution for snapshot replication.

In a first aspect of the present disclosure, there is provided a method of snapshot replication. The method includes: in response to a first session for asynchronous snapshot replication being established between a first source device and a destination device, determining whether the first source device and the destination device have a common baseline snapshot, the baseline snapshot indicating progress of snapshot replication. The method further includes: in response to determining absence of the baseline snapshot, determining whether initial synchronization from a second source device to the destination device is completed, a second session for synchronous snapshot replication existing between the first source device and the second source device before the first session is established, and a previously established third session for asynchronous snapshot replication existing between the second source device and the destination device, the initial synchronization being a part of the third session. The method further includes: replicating, based on a result of the determining, at least one user snapshot at the first source device to the destination device.

In a second aspect of the present disclosure, there is provided an electronic device. The electronic device includes a processor and a memory coupled with the processor, the memory having instructions stored thereon which, when executed by the processor, causing the electronic device to perform acts. The acts include: in response to a first session for asynchronous snapshot replication being established between a first source device and a destination device, determining whether the first source device and the destination device have a common baseline snapshot, the baseline snapshot indicating progress of snapshot replication. The acts further include: in response to determining absence of the baseline snapshot, determining whether initial synchronization from a second source device to the destination device is completed, a second session for synchronous snapshot replication existing between the first source device and the second source device before the first session is established, and a previously established third session for asynchronous snapshot replication existing between the second source device and the destination device, the initial synchronization being a part of the third session. The acts further include: replicating, based on a result of the determining, at least one user snapshot at the first source device to the destination device.

In a third aspect of the present disclosure, there is provided a computer program product. The computer program product is tangibly stored in a computer readable medium and includes machine executable instructions which, when executed, cause the machine to perform a method according to the first aspect of the present disclosure.

The Summary provided is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the following more detailed description of the example embodiments of the present disclosure with reference to the accompanying drawings, wherein the same reference sign generally refers to the like element in the example embodiments of the present disclosure.

DETAILED DESCRIPTION OF EMBODIMENTS

Figure 1:
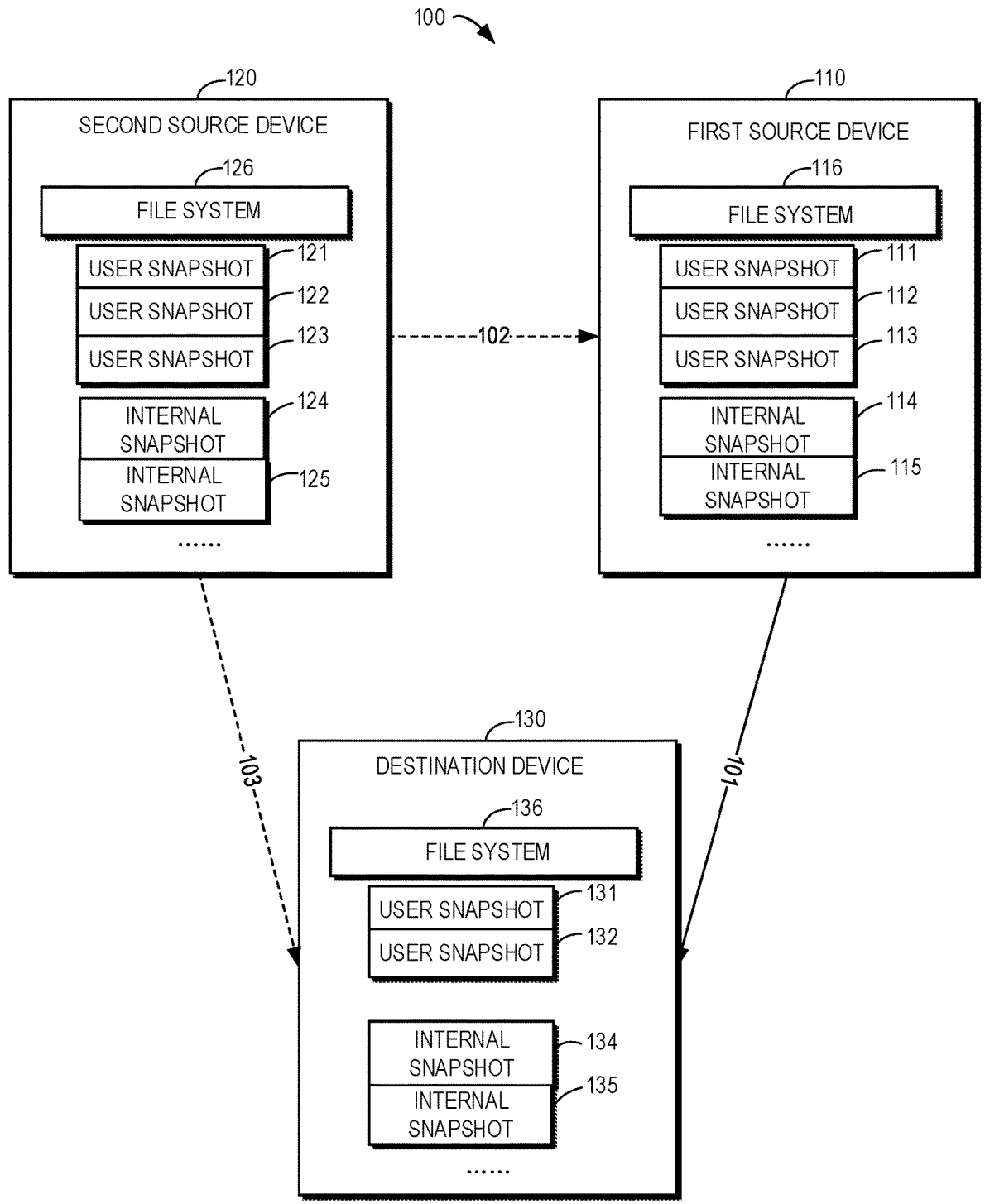
FIG. 1 shows a schematic diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one further embodiment." The terms "first", "second" and so on can refer to same or different objects. Other definitions, either explicit or implicit, may be included below.

FIG. 1 shows a schematic diagram of an example environment 100 in which embodiments of the present disclosure may be implemented. Devices 110, 120 and 130 are deployed at different sites, e.g. at different data centers. The devices 110, 120 and 130 may be file servers such as network attached storage (NAS) servers. For example, a file system 126 and snapshots for the file system 126 are stored in the second source device 120.

In order to better protect the file system to provide file service to users, snapshots of the file system need to be replicated to devices at different sites. The example environment 100 supports synchronous replication of a snapshot from one source device to multiple destination devices. In the example environment 100 as shown in FIG. 1, the second source device 120 is used as a productive site (also referred to as a host site herein) before the switch of sites. When the host site is switched from the second source device 120 to the first source device 110, a session 101 for asynchronous snapshot replication will be established between the first source device 110 and the destination device 130, and the session 101 is also referred to as the first session 101 herein.

Before the switch of sites, a session 102 for synchronous snapshot replication is established between the second source device 120 and the first source device 110, and the session 102 is also referred to as the second session 102 herein. A file system 116 is a copy of the file system 126 at the first source device 110. Accordingly, snapshots 111-115 are created by replicating via the second session 102 snapshots 121-125 at the second source device 120 to the first source device 110, respectively. In addition, before the switch, a session 103 for asynchronous snapshot replication is established between the second source device 120 and the destination device 130, and the session 103 is also referred to as the third session 103 herein. A file system 136 is a copy of the file system 126 at the destination device 130. Accordingly, snapshots 131, 132, 134 and 135 are created by replicating via the third session 103 snapshots 121, 122, 124 and 125 at the second source device 120 to the destination device 130 respectively.

Although FIG. 1 merely illustrates one file system 126, more file systems may exist in the first source device 110, and these file systems together with their snapshots are also replicated to the first source device 110 and the destination device 130. In addition, it should be understood that the so-called source device and destination device herein are relative concepts. Before the switch, both the first source device 110 and the destination device 130 are "destinations" with respect to the second source device 120.

As shown in FIG. 1, snapshots for the file system may include user snapshots and internal snapshots. User snapshots are "APP consistent" snapshots created by a user, and internal snapshots may be regarded as system snapshots generated by a replication session. For the same and one file system, usually there exist two internal snapshots.

The asynchronous replication session between two devices usually includes two stages, i.e. initial synchronization and incremental replication. In other words, there are two scenarios for replication of user snapshots via asynchronous replication. The first scenario is initial synchronization. When an asynchronous replication session (e.g. the second session 102 or the first session 101) is created, usually one option "replicateExistingSnaps" will be set. If this option is set to "Yes", then all user snapshots existing at the source device (the second source device 120 for the second session 102, or the first source device 110 for the first session 101) will be replicated to the destination device 130 during the initial synchronization.

The second scenario is incremental replication, which is used to replicate user snapshots generated during the recovery point objective (RPO). After the asynchronous replication session exists, when a user snapshot is created, the user can select whether to "replicate" or protect this user snapshot. If one user snapshot is selected to be replicated, then the user snapshot will be replicated to the destination device 130 during next RPO synchronization. The user may further select via a "replicate" operation or command to replicate a snapshot which is not selected to be replicated when being created. Such a snapshot will be replicated during next RPO synchronization since the user selects to replicate.

Each user snapshot has some properties for snapshot replication. The property "ReplicateState" is used to identify a state related to asynchronous replication of the user snapshot. It has the following values: "No," indicating that this user snapshot does not need to be replicated; "Pending," indicating that this user snap is marked to be replicated but has not been replicated; "Replicated_To_Destination," indicating that this user snapshot has been replicated to the destination device.

The property "TimeStampMarkedForReplication" is used to indicate the time when this user snapshot is marked to be replicated. The property "Version signature" is the unique identification of the snapshot, which usually is composed of multiple character strings, such as [VsidStr], [CelerraId] and [VersionNum]. The character string [VsidStr] may be used to identify for which file system the snapshot is; the character string [CelerraId] may be used to identify at which machine the file system is located; and the character string [VersionNum] may be used to identify a version number of the snapshot with respect to the file system of the machine. Therefore, the property "Version signature" may uniquely identify a snapshot of a device.

When the user snapshot is replicated to the first source device 110 or the destination device 130 via the second session 102 or the third session 103, the snapshot properties will also be replicated. Therefore, the properties of the user snapshot 111 are the same as those of the user snapshot 121 for example.

The internal snapshot may also have the property "Version signature" for identification as described above with respect to the user snapshot. When initial synchronization or incremental replication is performed between the second source device 120 and the destination device 130, the internal snapshots 134 and 135 at the destination device 130 will be updated (or refreshed) to be the same as the internal snapshots 124 and 125 at the second source device 120, and the property "Version signature" will also be updated.

The internal snapshot may be used as a baseline snapshot for indicating the progress of asynchronous snapshot replication. For example, in general, the two internal snapshots 124 and 125 at the second source device 120 may be used as a baseline snapshot in turn, which may increase the data security. Only as an example, when snapshot replication is performed between the second source device 120 and the destination device 130 at a certain time, the internal snapshot 135 is updated to be the same as the internal snapshot 125, and the internal snapshot 134 is preserved as an internal snapshot of the file system 125 in the previous asynchronous replication operation. In this case, the internal snapshot 135 and the internal snapshot 125 are common baseline snapshots between the second source device 120 and the destination device 130. Since the first source device 110 and the second source device 120 are in synchronous replication configuration, in normal cases, the first source device 110 and the destination device 130 also have common baseline snapshots, i.e. the internal snapshot 115 and the internal snapshot 135.

When asynchronous snapshot replication is performed between the source device and the destination device, baseline snapshots will be used as a reference. It should be understood that the numbers of user snapshots and internal snapshots shown in FIG. 1 are merely illustrative and not intended to limit the scope of the present disclosure. In embodiments of the present disclosure, there may be more or less user snapshots and internal snapshots.

Conventionally, when the source device (e.g. the file server at the host site) is to replicate user snapshots to the destination device, the source device will enumerate user snapshots to be synchronized. Specifically, the source device first refreshes the file system to the internal snapshot of two internal snapshots which currently is not used as a common baseline snapshot, and then determines whether there exists a common baseline snapshot between the destination device and the source device. If the common baseline snapshot exists, the source device sets a start time of replication intervals to be the updated time of the common baseline snapshot; if the common baseline snapshot does not exist, the source device sets the start time of replication intervals to be zero (or initiating time of the source device). Then, the source device sets an end time of replication intervals to be the updated time of a recently updated snapshot.

Next, the source device will use the property "TimeStampMarkedForReplication" of user snapshots to determine, with respect to each user snapshot at the source device, whether the respective user snapshot should be added to a transfer list. If a certain user snapshot is marked as the to-be-replicated time (i.e. time indicated by "TimeStampMarkedForReplication") falling within the determined replication interval, then the user snapshot will be added to the transfer list. After determining the transfer list, the source device replicates each user snapshot in the transfer list to the destination device, and at the same time updates the internal snapshot used as the baseline snapshot. After receiving the replicated user snapshot, the destination device will also synchronously updates its internal snapshot used as the baseline snapshot.

When the host site is switched from the second source device to the first source device, the asynchronous replication session will be switched to the first source device. The switch of the asynchronous replication session is also referred to as preservation of the asynchronous replication session. After the switch, snapshots at the first source device will be replicated to the destination device, and the asynchronous replication session between the first source device and the destination device will also follow the above process.

However, inventors have realized this implementation has the following problems. One problem is that the common baseline snapshot for the first source device and the destination device may be lost. Before the switch, the first source device and the second source device are in synchronous replication configuration. If a connection between the first source device and the second source device is temporarily interrupted when replication is performed between the second source device and the destination device, then the update of the baseline snapshot cannot be synchronized to the first source device. In this case, there is no common baseline snapshot between the first source device and the destination device. If the option "replicateExistingSnaps" for asynchronous replication between the second source device and the destination device is set to "Yes," then all user snapshots existing at the second source device have been replicated to the destination device. When the asynchronous replication session is established between the second source device and the destination device and a common baseline snapshot is absent between the second source device and the destination device, these user snapshots which have been replicated will be replicated from the second source device to the destination device, so that there are duplicated user snapshots at the destination device.

The other problem is due to that the switch occurs during the synchronization between the second source device and the destination device. If the switch of a host site occurs during snapshot replication between the second source device and the destination device, then the baseline snapshot is not updated. In this case, when asynchronous replication is performed between the first source device and the destination device, the start time of replication intervals is regarded as the time of last completed asynchronous replication. As a result, user snapshots which have been replicated to the destination device will be replicated again.

A straightforward method for solving the above problems is to delete existing snapshots at the destination device. However, since the file system usually implements some other functions based on these snapshots, it is not safe to simply delete snapshots.

The present disclosure provides a solution for snapshot replication so as to at least eliminate one or more of the above drawbacks. In the solution, an identification of an internal snapshot stored at the destination device is used to determine whether initial synchronization of snapshots between the destination device and the second source device is completed, and a user snapshot to be replicated is determined on this basis. In the solution, it may further be determined by a replicate state of a user snapshot maintained at the first source device whether the user snapshot has been replicated to the destination device, so as to further filter out a user snapshot to be replicated. In this way, duplicated snapshots at the destination device may be avoided, so that the storage space is saved and the snapshot management difficulty is reduced.

Figure 2:
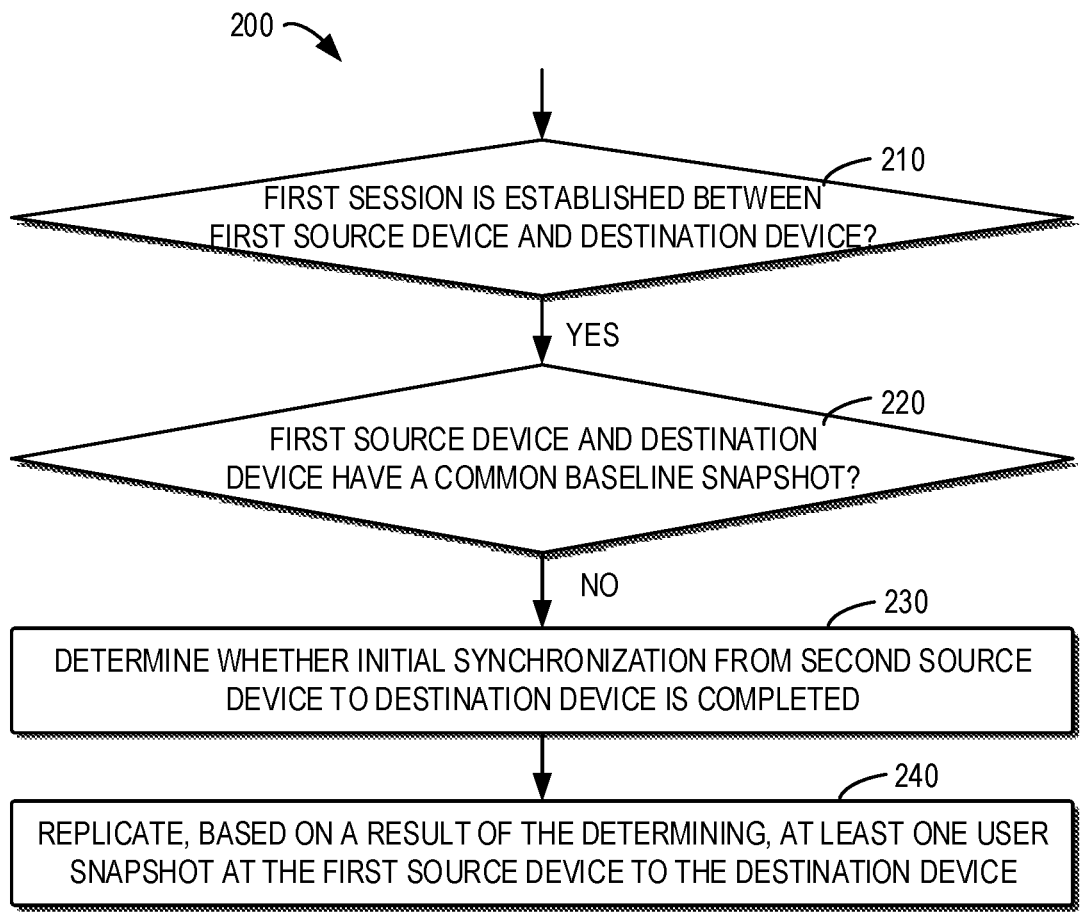
FIG. 2 shows a flowchart of a process of snapshot replication according to embodiments of the present disclosure.

Embodiments of the present disclosure will be described in detail with reference to the accompanying drawings. FIG. 2 shows a flowchart of a process 200 of snapshot replication according to embodiments of the present disclosure. The process 200 may be implemented by the first source device 110. For the sake of discussion, the process 200 is described below in conjunction with FIG. 1.

At block 210, the first source device 110 determines whether the first session 101 is established between the first source device 110 and the destination device 130. If the first source device 110 determines that the first session 101 is established, then the process 200 proceeds to block 220.

At block 220, the first source device 110 determines whether the first source device 110 and the destination device 130 have a common baseline snapshot. The first source device 110 may determine snapshot identifications of the internal snapshots 114 and 115 maintained by itself, such as "Version signature" as mentioned above.

In some embodiments, the first source device 110 may send to the destination device 130 a request including snapshot identifications of the internal snapshots 114 and 115. After receiving the request, the destination device 130 may compare the received snapshot identifications with snapshot identifications of the internal snapshots 134 and 135 at the destination device 130. If the snapshot identification of one of the internal snapshots 114 and 115 matches with that of one of the internal snapshots 134 and 135, then it is considered that the common baseline snapshot exists. For example, if the destination device 130 determines that the snapshot identification of the internal snapshot 135 is the same as that of the internal snapshot 115, then the first source device 110 and the destination device 130 have the common baseline snapshot. Otherwise, there is no common baseline snapshot between the first source device 110 and the destination device 130.

In other embodiments, the first source device 110 may receive from the destination device 130 snapshot identifications of the internal snapshots 134 and 135 at the destination device 130 and compare them with snapshot identifications of internal snapshots 114 and 115. The first source device 110 may determine whether the first source device 110 and the destination device 130 have a common baseline snapshot in a similar way.

If the first source device 110 determines that the first source 110 and the destination device 130 have the common baseline snapshot (such as internal snapshots 115 and 135), then the first source device 110 may add to a transfer list a user snapshot (e.g. user snapshot 113) which is synchronously replicated to the first source device 110 from the second source device 120 after the last update of the common baseline snapshot. In some embodiments, the first source device 110 may perform further selection on such user snapshots based on the replicate states of such user snapshots. Such embodiments will be described in detail below with reference to FIG. 5.

If the first source device 110 determines absence of the common baseline snapshot between the first source device 110 and the destination device 130, then the process 200 proceeds to block 230. At block 230, the first source device 110 determines whether initial synchronization from the second source device 120 to the destination device 130 is completed.

In some embodiments, the first source device 110 may send a request to the destination device 130, so that the destination device 130 determines whether the initial synchronization is completed, based on snapshot identifications (snapshot identifications of the internal snapshots 134 and 135) stored at the destination device 130. Then the first source device 110 may determine whether the initial synchronization is completed, based on a received response to the request. If a positive response to the request is received from the destination device 130, then the first source device 110 may determine that the initial synchronization has been completed. Accordingly, if a negative response to the request is received from the destination device 130, then the first source device 110 may determine that the initial synchronization has not yet been completed.

Figure 3:
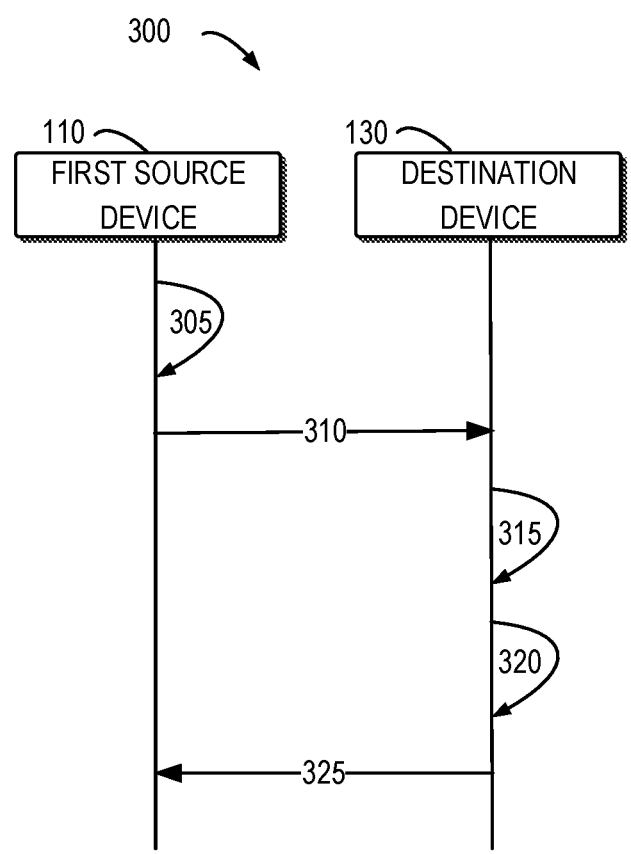
FIG. 3 shows a schematic diagram of interaction between a first source device and a destination device according to some embodiments of the present disclosure.

In some implementations, the request for the common baseline snapshot and the request for the initial synchronization may be sent to the destination device 130 together. Such implementations are described with reference to FIG. 3. FIG. 3 shows a schematic diagram 300 of interaction between the first source device 110 and the destination device 130 according to some embodiments of the present disclosure.

The first source device 110 determines 305 snapshot identifications of the internal snapshots 114 and 115 maintained by the first source device 110, e.g. the snapshot property "Version signature". The file system usually stores specific information for internal snapshots which can be used as baseline snapshots, so as to identify such internal snapshots. Therefore, the first source device 110 may use the specific information to determine the internal snapshots 114 and 115 and their snapshot identifications.

The first source device 110 sends 310 a request to the destination request 130, and snapshot identifications of the internal snapshots 114 and 115 may be sent along with the request. The destination device 130 determines 315 whether the first source device 110 and the destination device 130 have a common baseline snapshot, by the above-described comparison of snapshot identifications.

Next, the destination device 130 determines 320 whether initial synchronization from the second source device 120 to the destination device 130 is completed. This may be achieved by checking snapshot identifications of the internal snapshots 134 and 135 at the destination device 130. Snapshot identifications of the internal snapshots 134 and 135 will not be set, or will be set as predetermined identifications when the internal snapshots are created. When initial synchronization of snapshots is performed between the second source device 120 and the destination device 130, the internal snapshots 134 and 135 will be updated as the corresponding internal snapshots at the second source device 120, and snapshot identifications will also be set or updated as snapshot identifications of the corresponding internal snapshots at the second source device 120.

Therefore, as long as the snapshot identification of one of the internal snapshots 134 and 135 has been set or is different from the predetermined identifications, the destination device 130 may determine that the initial synchronization from the second source device 120 to the destination device 130 has been completed. If snapshot identifications of the internal snapshots 134 and 135 are not set or are the same as the predetermined identifications, then the destination device 130 may determine that the initial synchronization from the second source device 120 to the destination device 130 has not yet been completed.

The destination device 130 sends 325 to the first source device 110 a response to the received request. The response may include an acknowledgment regarding whether there is a common baseline snapshot and an acknowledgment regarding whether the initial synchronization is completed.

In some other embodiments, the first source 110 may request the destination device 130 to send snapshot identifications of the internal snapshots 134 and 135 at the destination device 130, so as to determine whether the initial synchronization is completed. The first source device 110 may receive from the destination device 130 snapshot identifications of the internal snapshots 134 and 135 stored at the destination device 130, e.g. the above described "Version signature." Then, the first source device 110 may determine whether the received snapshot identifications are the same as the predetermined identifications. If the received snapshot identifications are different from the predetermined identifications, then it may be considered that the internal snapshots 134 and 135 at the destination device 130 have been updated. Thus the first source device 110 may determine that the initial synchronization has been completed. If the received snapshot identifications are the same as the predetermined identifications, then the first source device 110 may determine that the initial synchronization has not yet been completed.

Figure 4:
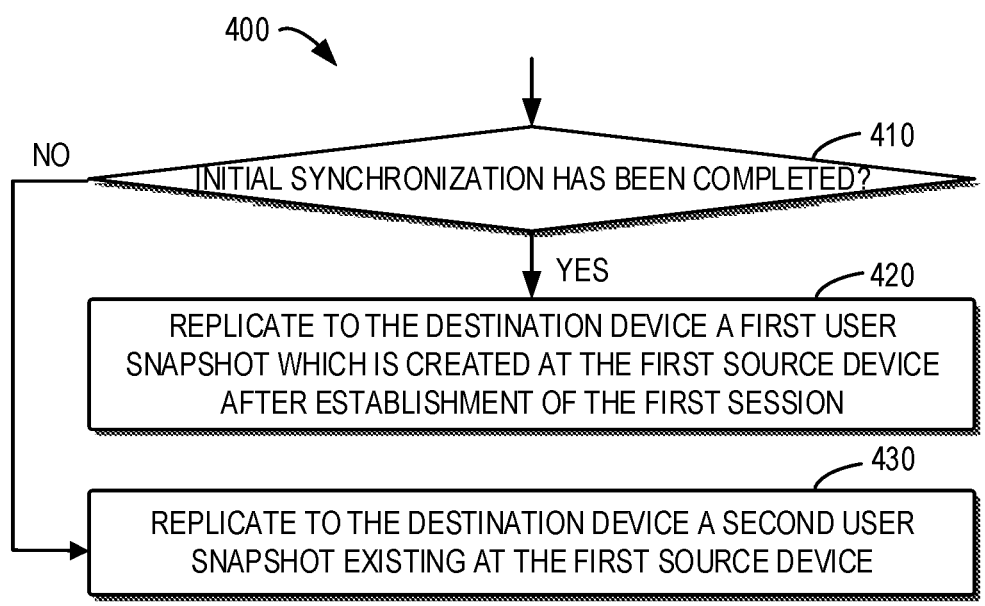
FIG. 4 shows a flowchart of a process of snapshot replication according to some embodiments of the present disclosure.

Still refer to FIG. 2. At block 240, the first source device 110 replicates to the destination device 130 at least one user snapshot at the first source device 110, based on a result of the determining at the block 230. This process is described with reference to FIG. 4. FIG. 4 shows a flowchart of a process 400 of snapshot replication according to some embodiments of the present disclosure. The process 400 may be regarded as a specific implementation of block 240.

At block 410, the first source device 110 determines whether the initial synchronization from the second source device 120 to the destination device 130 is completed. If it is determined that the initial synchronization has been completed, then the process 400 proceeds to block 420. At block 420, the first source device 110 replicates to the destination device 130 a user snapshot (also referred to as a first user snapshot herein) which is created at the first source device 110 after the establishment of the first session 101. As an example, if the user snapshot 113 is created after the establishment of the first session 101, then the first source device 110 replicates the user snapshot 113 to the destination device 130.

If it is determined that initial synchronization has not yet been completed, then the process 400 proceeds to block 430. At block 430, the first source device 110 replicates to the destination device 130 a user snapshot (also referred to as a second user snapshot herein) existing at the first source device 110. For example, the first source device 110 replicates all the user snapshots 111-113 to the destination device 130. It should be understood that the so-called second user snapshot may also include the first user snapshot and a user snapshot which is replicated from the second source device 120 to the first source device 110 during the second session 102.

In embodiments of the present disclosure, user snapshots which are created or replicated to the first source device at different times are selected so as to be replicated to the destination device, depending on whether the initial synchronization from the second source device to the destination device is completed. In this way, duplicated user snapshots at the destination device (e.g. the backup server of the file system) may be reduced significantly. The snapshot management and resource use of the destination device may also be improved.

To solve the other problem in the process of preserving an asynchronous replication session, in some embodiments, user snapshots to be replicated may further be selected based on replicate states of user snapshots at the first source device 110. After user snapshots potentially to be replicated to the destination device 130 are obtained based on whether there is a common baseline snapshot and whether the initial synchronization is completed, for example, after such user snapshots are added to the transfer list, user snapshots which are already replicated to the destination device 130 may be filtered by checking replicate states of the user snapshots.

Figure 5:
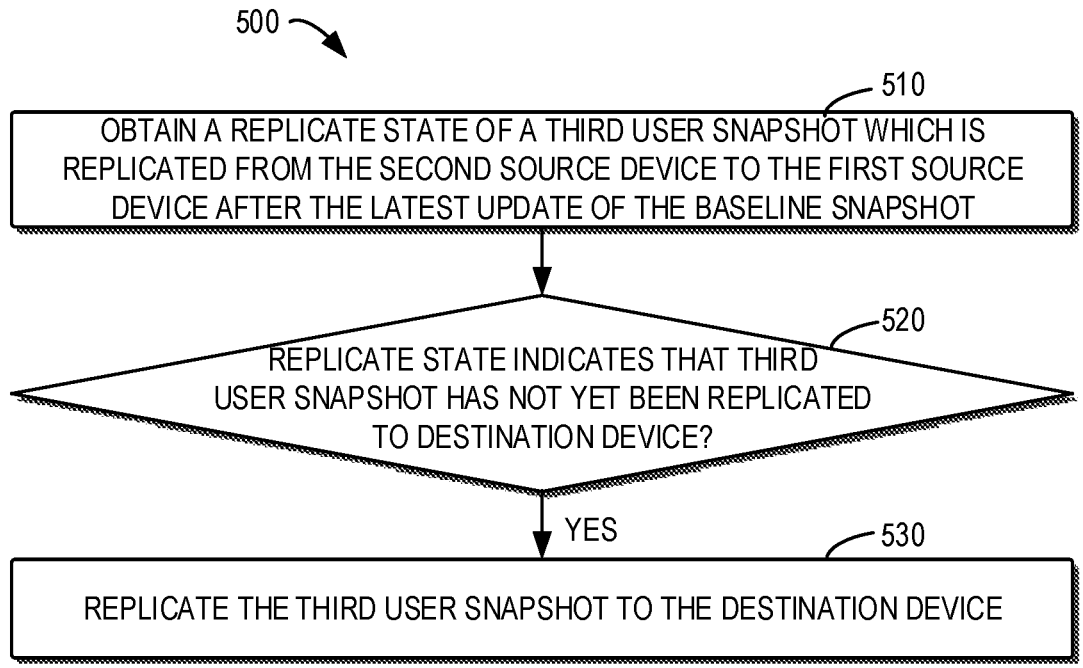
FIG. 5 shows a flowchart of a process of further selecting user snapshots according to some embodiments of the present disclosure.

The checking of replicate states may be performed independently of results of the determining of the common baseline snapshot and initial synchronization. As mentioned with reference to FIG. 2, in the case where there is a common baseline snapshot between the first source device 110 and the destination device 130, replicate states of the user snapshots potentially to be replicated may further be checked. FIG. 5 shows a flowchart of a process 500 of further selecting a user snapshot according to some embodiments of the present disclosure. The process 500 shown in FIG. 5 may be implemented by the first source device 110 when there is a common baseline snapshot between the first source device 110 and the destination device 130.

As mentioned above, the file system may maintain multiple properties for a user snapshot. For example, when the property "ReplicateState" is set as a predefined value or characters (e.g. "Replicated_To_Destination"), the user snapshot has been replicated to the destination device via the asynchronous replication session. The replicate state of the user snapshot which is replicated to the destination device 130 during the third session 103 will be synchronized to the first source device 110 via the second session 102.

At block 510, the first source device 110 may obtain a replicate state of a user snapshot (also referred to as a third user snapshot herein) which is replicated from the second source device 120 to the first source device 110 after the latest update of the common baseline snapshot. The replicate state is determined during the second session 102, i.e., the replicate state is updated via the synchronous replication session between the first source 110 and the second device 120.

At block 520, the first source device 110 may determine whether the replicate state indicates that the third user snapshot has not yet been replicated to the destination device 130. If the replicate state indicates that the third user snapshot has not yet been replicated to the destination device 130, then the process 500 proceeds to block 530. For example, if the replicate state of the user snapshot 112 is set to be "pending", then it may be determined that the user snapshot 112 has not yet been replicated to the destination device 130. At block 530, the first source device 110 replicates the third user snapshot to the destination device 130.

If the switch between the first source device 110 and the second source device 120 occurs during the incremental replication between the second source device 120 and the destination device 130, then in the destination device 130 there is a user snapshot which is replicated to the destination device after the update of the common baseline snapshot. In such embodiments, the duplicated replication of such user snapshots may be avoided.

Embodiments in which replicate states are checked when there is a common baseline snapshot between the first source device 110 and the destination device 130 has been described with reference to FIG. 5. In the case where there is no common baseline snapshot between the first source device 110 and the destination device 130, the checking of replicate states may be performed at blocks 420 and 430.

In some implementations, at block 430, replicate states of all user snapshots existing at the first source device 110 may be checked. In some other implementations, at block 430, the checking of replicate states may only be performed on a user snapshot (also referred to as a second user snapshot) which is replicated from the second source device 120 to the first source device 110 during the second session 102. Specifically, the first source device 110 may obtain the replicate state of the second user snapshot, e.g. the above mentioned property "ReplicateState". The replicate state is determined during the second session 102. If the replicate state indicates that the second user snapshot has not yet been replicated to the destination device 130, then the first source device 110 may replicate the second user snapshot to the destination device 130. If the replicate state indicates that the second user snapshot has been replicated to the destination device 130, then the first source device 110 may not replicate the second user snapshot to the destination device 130.

If the switch between the first source device 110 and the second source device 120 occurs during the initial synchronization (initial synchronization has been started but has not yet been completed) between the second source device 120 and the destination device 130, then the checking of replicate states additionally performed at block 430 may further filter the user snapshot that has been replicated to the destination device 130.

In such embodiments, duplicated replication of snapshots may be further reduced by additionally checking the replicate states of user snapshots potentially to be replicated. In this way, the snapshot management and space use of the destination device (e.g. a backup server) may be further improved. It should be understood that the process of checking replicate states may be performed either before or after user snapshots is added to the transfer list.

Figure 6:
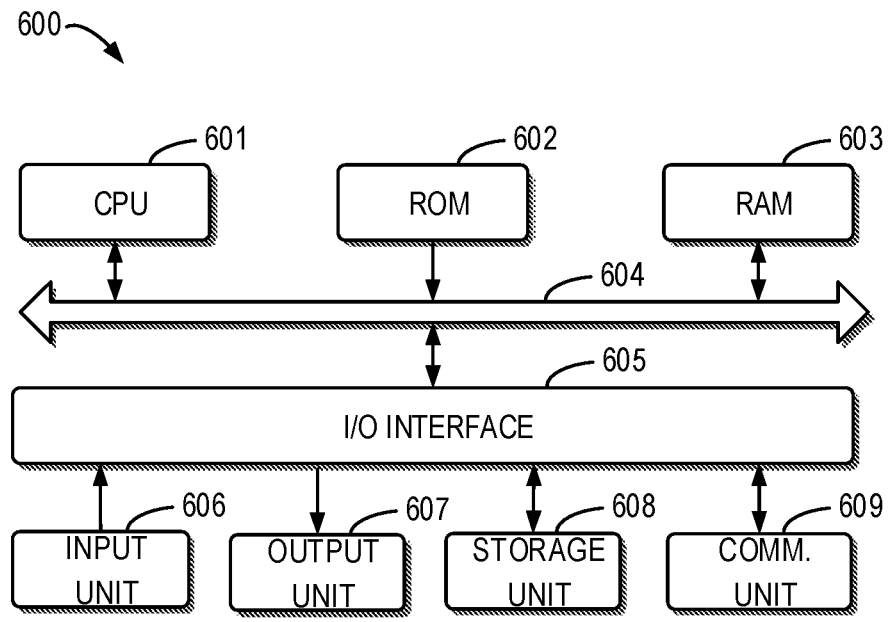
FIG. 6 shows a block diagram of an example device that can be used to implement embodiments of the present disclosure.

FIG. 6 is a schematic block diagram illustrating an example device 600 that can be used to implement embodiments of the present disclosure. As illustrated, the device 600 includes a central processing unit (CPU) 601 which can perform various suitable acts and processing based on the computer program instructions stored in a read-only memory (ROM) 602 or computer program instructions loaded into a random access memory (RAM) 603 from a storage unit 608. The RAM 603 also stores various types of programs and data required by operating the storage device 600. CPU 601, ROM 602 and RAM 603 are connected to each other via a bus 604 to which an input/output (I/O) interface 605 is also connected.

Various components in the device 600 are connected to the I/O interface 605, including: an input unit 606, such as a keyboard, mouse and the like; an output unit 607, such as a variety of types of displays, loudspeakers and the like; a storage unit 608, such as a magnetic disk, optical disk and the like; and a communication unit 609, such as a network card, modem, wireless communication transceiver and the like. The communication unit 609 enables the device 600 to exchange information/data with other devices via a computer network such as Internet and/or a variety of telecommunication networks.

The processing unit 601 performs various methods and processes as described above, for example, any of the processes 200, 400 and 500. For example, in some embodiments, any of the processes 200, 400 and 500 may be implemented as a computer software program or computer program product, which is tangibly included in a machine-readable medium, such as the storage unit 608. In some embodiments, the computer program can be partially or fully loaded and/or installed to the device 600 via ROM 602 and/or the communication unit 609. When the computer program is loaded to RAM 603 and executed by CPU 601, one or more steps of any of the processes 200, 400 and 500 described above are implemented. Alternatively, in other embodiments, CPU 601 may be configured to implement any of the processes 200, 400 and 500 in any other suitable manner (for example, by means of a firmware).

According to some embodiments of the present disclosure, there is provided a computer readable medium. The computer readable medium is stored with a computer program which, when executed by a processor, implements the method according to the present disclosure.

Those skilled in the art would understand that various steps of the method of the disclosure above may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus (e.g., specialized circuitry) have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of snapshot replication, comprising:
    in response to a first session for asynchronous snapshot replication being established between a first source device and a destination device, determining whether the first source device and the destination device have a common baseline snapshot, the common baseline snapshot indicating progress of snapshot replication;
    in response to determining that the first source device and the destination device do not have the common baseline snapshot, determining whether initial synchronization from a second source device to the destination device has been completed, a second session for synchronous snapshot replication existing between the first source device and the second source device before the first session is established, and a previously established third session for asynchronous snapshot replication existing between the second source device and the destination device, the initial synchronization including replicating all user snapshots existing at the second source device to the destination device, the initial synchronization being a part of the third session;

in response to determining that the initial synchronization from the second source device to the destination device has been completed, replicating a first user snapshot existing at the first source device to the destination device, the first user snapshot being created at the first source device after establishment of the first session; and in response to determining that the initial synchronization from the second source device to the destination device has not yet been completed, replicating a second user snapshot existing at the first source device to the destination device, the second user snapshot having a replicate state indicating that the second user snapshot has not yet been replicated to the destination device.

2. The method of claim 1, wherein the second user snapshot is replicated from the second source device to the first source device during the second session, and wherein replicating to the destination device the second user snapshot comprises:

obtaining the replicate state of the second user snapshot, the replicate state being determined during the second session.

3. The method of claim 1, further comprising:

in response to determining that the first source device and the destination device have the common baseline snapshot, obtaining a replicate state of a third user snapshot which is replicated from the second source device to the first source device after a latest update of the common baseline snapshot, the replicate state of the third user snapshot being determined during the second session; and in response to the replicate state indicating that the third user snapshot has not yet been replicated to the destination device, replicating the third user snapshot to the destination device.

4. The method of claim 1, wherein determining whether the initial synchronization has been completed comprises:

sending a request to the destination device, so that the destination device determines whether the initial synchronization has been completed, based on a snapshot identification stored at the destination device; and in response to receiving from the destination device a positive response to the request, determining that the initial synchronization has been completed.

5. The method of claim 1, wherein determining whether the initial synchronization has been completed comprises:

receiving from the destination device a snapshot identification stored at the destination device;

determining whether the snapshot identification is same as a predetermined identification; and in response to the snapshot identification being different from the predetermined identification, determining that the initial synchronization has been completed.

6. An electronic device, comprising:

a processor; and a memory coupled with the processor, the memory having instructions stored therein which, when executed by the processor, causing the electronic device to perform acts comprising:

in response to a first session for asynchronous snapshot replication being established between a first source device and a destination device, determining whether the first source device and the destination device have a common baseline snapshot, the common baseline snapshot indicating progress of snapshot replication;

in response to determining that the first source device and the destination device do not have the common baseline snapshot, determining whether initial synchronization from a second source device to the destination device has been completed, a second session for synchronous snapshot replication existing between the first source device and the second source device before the first session is established, and a previously established third session for asynchronous snapshot replication existing between the second source device and the destination device, the initial synchronization including replicating all user snapshots existing at the second source device to the destination device, the initial synchronization being a part of the third session;

in response to determining that the initial synchronization from the second source device to the destination device has been completed, replicating a first user snapshot existing at the first source device to the destination device, the first user snapshot being created at the first source device after establishment of the first session; and in response to determining that the initial synchronization from the second source device to the destination device has not yet been completed, replicating a second user snapshot existing at the first source device to the destination device, the second user snapshot having a replicate state indicating that the second user snapshot has not yet been replicated to the destination device.

7. The electronic device of claim 6, wherein the second user snapshot is replicated from the second source device to the first source device during the second session, and wherein replicating to the destination device the second user snapshot comprises:

obtaining the replicate state of the second user snapshot, the replicate state being determined during the second session.

8. The electronic device of claim 6, wherein the acts further comprise:

in response to determining that the first source device and the destination device have the common baseline snapshot, obtaining a replicate state of a third user snapshot which is replicated from the second source device to the first source device after a latest update of the common baseline snapshot, the replicate state of the third user snapshot being determined during the second session; and in response to the replicate state indicating that the third user snapshot has not yet been replicated to the destination device, replicating the third user snapshot to the destination device.

9. The electronic device of claim 6, wherein determining whether the initial synchronization has been completed comprises:

sending a request to the destination device, so that the destination device determines whether the initial synchronization has been completed, based on a snapshot identification stored at the destination device; and in response to receiving from the destination device a positive response to the request, determining that the initial synchronization has been completed.

10. The electronic device of claim 6, wherein determining whether the initial synchronization has been completed comprises:
   receiving from the destination device a snapshot identification stored at the destination device;
   determining whether the snapshot identification is same as a predetermined identification; and
   in response to the snapshot identification being different from the predetermined identification, determining that the initial synchronization has been completed.

11. A computer program product having a non-transitory computer readable medium which stores a set of instructions to perform snapshot replication; the set of instructions, when carried out by computerized circuitry, causing the computerized circuitry to perform a method of:
   in response to a first session for asynchronous snapshot replication being established between a first source device and a destination device, determining whether the first source device and the destination device have a common baseline snapshot, the common baseline snapshot indicating progress of snapshot replication;
   in response to determining that the first source device and the destination device do not have the common baseline snapshot, determining whether initial synchronization from a second source device to the destination device has been completed, a second session for synchronous snapshot replication existing between the first source device and the second source device before the first session is established, and a previously established third session for asynchronous snapshot replication existing between the second source device and the destination device, the initial synchronization including replicating all user snapshots existing at the second source device to the destination device, the initial synchronization being a part of the third session;
   in response to determining that the initial synchronization from the second source device to the destination device has been completed, replicating a first user snapshot existing at the first source device to the destination device, the first user snapshot being created at the first source device after establishment of the first session; and
   in response to determining that the initial synchronization from the second source device to the destination device has not yet been completed, replicating a second user snapshot existing at the first source device to the destination device, the second user snapshot having a replicate state indicating that the second user snapshot has not yet been replicated to the destination device.

* * * * *